US008099287B2

(12) United States Patent
Bodin et al.

(10) Patent No.: US 8,099,287 B2
(45) Date of Patent: Jan. 17, 2012

(54) AUTOMATICALLY PROVIDING A USER WITH SUBSTITUTES FOR POTENTIALLY AMBIGUOUS USER-DEFINED SPEECH COMMANDS

(75) Inventors: William K. Bodin, Austin, TX (US);
James R. Lewis, Delray Beach, FL (US); Leslie R. Wilson, Boca Raton, FL (US)

(73) Assignee: Nuance Communications, Inc., Burlington, MA (US)

( * ) Notice: Subject to any disclaimer, the term of this patent is extended or adjusted under 35 U.S.C. 154(b) by 1172 days.

(21) Appl. No.: 11/567,084

(22) Filed: Dec. 5, 2006

(65) Prior Publication Data
US 2008/0133244 A1    Jun. 5, 2008

(51) Int. Cl.
*G10L 21/00* (2006.01)
*G10L 15/00* (2006.01)
*G10L 21/04* (2006.01)

(52) U.S. Cl. .............. 704/275; 704/9; 704/10; 704/270
(58) Field of Classification Search .................. None
See application file for complete search history.

(56) References Cited

U.S. PATENT DOCUMENTS

| 5,386,494 A | | 1/1995 | White |
| 5,974,413 A | * | 10/1999 | Beauregard et al. .................. 1/1 |
| 5,987,411 A | * | 11/1999 | Petroni et al. ................. 704/255 |
| 6,134,527 A | * | 10/2000 | Meunier et al. ................ 704/247 |
| 6,839,699 B2 | | 1/2005 | Chan |
| 2002/0198722 A1 | * | 12/2002 | Yuschik ........................ 704/275 |
| 2003/0125945 A1 | | 7/2003 | Doyle |
| 2004/0193416 A1 | | 9/2004 | Emonts et al. |
| 2004/0249637 A1 | * | 12/2004 | Baker ............................ 704/239 |
| 2006/0106614 A1 | * | 5/2006 | Mowatt et al. ................. 704/275 |

FOREIGN PATENT DOCUMENTS

| JP | 11-119792 A | 4/1999 |
| JP | 2005043461 | 2/2005 |

OTHER PUBLICATIONS

Office Action from Chinese Patent Application 200710185200.9, issued Sep. 2, 2010.

* cited by examiner

*Primary Examiner* — Justin Rider
(74) *Attorney, Agent, or Firm* — Wolf, Greenfield & Sacks, P.C.

(57) ABSTRACT

A method for alleviating ambiguity issues of new user defined speech commands. An original command for a user-defined speech command can be received. It can then be determined if the original command is likely to be confused with a set of existing speech commands. When confusion is unlikely, the original command can be automatically stored. When confusion is likely, a substitute command that is unlikely to be confused with existing commands can be automatically determined. The substitute can be presented as an alternative to the original command and can be selectively stored as the user-defined speech command.

20 Claims, 4 Drawing Sheets

AUTOMATICALLY PROVIDING A USER WITH SUBSTITUTES FOR POTENTIALLY AMBIGUOUS USER-DEFINED SPEECH COMMANDS

BACKGROUND

1. Field of the Invention

The present invention relates to the field of speech processing, and, more particularly, to automatically providing a user with substitutes for potentially ambiguous user-defined speech commands.

2. Description of the Related Art

Many speech-enabled applications allow for the creation of user-defined speech commands, which, once defined, can be used to trigger an associated action or set of actions. For example, a user of a speech-enabled mobile telephone can establish a user-defined speech command to call a frequent contact, such as a spouse. In another example, a speech-enabled word processor can include user-defined speech commands that are associated with macros. For instance, a command of "send redline" can result in the word processor generating a redline version of an active document and sending this document to an email address of the sender of the original version of the active document. In still another embodiment, a user of a speech-enabled portal can create a custom speech command that can be used to reference a defined collection of portlets.

A problem that plagues user-defined speech commands is that they are potentially acoustically similar to other existing speech commands, which can result in speech recognition ambiguities. For example, a user-defined speech command of "mail check" can be acoustically similar to a speech command for "spell check", which can result in a speech recognition system misinterpreting a user issued speech command.

Some speech-enabled systems include a mechanism for informing a user that a user-defined command is similar to an existing command, which can result in recognition confusion. A user can then be permitted to define a different speech command for the set of actions, or to override the speech-enabled system to have the system accept the potentially confusing command, regardless of the potential ambiguity. It is common, however, for a user to be unable to readily think of a substitute voice command for the original command. Even more frustrating for a user is thinking up one or more alternate commands only to discover that the alternate commands also result in potential ambiguities with existing speech commands.

A solution is needed to mitigate user frustration with potentially ambiguous user commands. Ideally, this solution would provide the user with substitute terms for a potentially ambiguous command that are allowable by the system. That is, the terms suggested are already known to not have any acoustical similarity with existing commands.

SUMMARY OF THE INVENTION

The present invention provides users with substitutes for potentially ambiguous user-defined speech commands. More specifically, when a user provides a new utterance to be associated with a user-defined speech command, a repository of existing commands can be searched for potentially confusing, ambiguous, or acoustically similar terms. In other words, a check can be performed to determine whether it is likely that the new utterance will be confused with one or more other speech commands.

When the utterance is not likely to be confused, it can be automatically stored as a new user-defined speech command. Otherwise, the speech processing system can determine at least one synonym or substitute for the user utterance that is not likely to be confused with an existing command. The user can be prompted to use the substitute instead of the original utterance to prevent confusion. When the user accepts the suggestion, the substitute can be stored as the new voice command. When the user refuses the suggestion and opts to retain the original utterance, the substitute can still be stored along with the new utterance for the user-defined speech command. The original utterance can be a primary mechanism for triggering the user-defined command and the substitute can be a secondary or backup mechanism. In situations where the user issued command is ambiguous with the original utterance, a user can be prompted to clarify an issued command, where the prompting includes the substitute instead of the original utterance. Further, when a list of available commands is presented, the substitute that is not potentially ambiguous can be presented in place of the original utterance that is potentially ambiguous.

The present invention can be implemented in accordance with numerous aspects consistent with the material presented herein. For example, one aspect of the present invention can include a method for alleviating ambiguity issues of new user-defined speech commands. An original command for a user-defined speech command can be received. It can then be determined if the original command is likely to be confused with a set of existing speech commands. When confusion is unlikely, the original command can be automatically stored. When confusion is likely, a substitute command that is unlikely to be confused with existing commands can be automatically determined. The substitute can be presented as an alternative to the original command and can be selectively stored as the user-defined speech command.

Another aspect of the present invention can include a method for resolving ambiguities with user-defined speech commands. An utterance associated with a user-defined speech command can be determined to be acoustically similar to an existing command. A substitute can be automatically determined for the utterance. The substitute can be presented as an alternative to the utterance.

Still another aspect of the present invention can include a speech processing system. The system can include at least one speech recognition grammar containing at least one user-defined command, a command execution engine, an ambiguity detection engine, a synonym data store, and a speech processing engine. The command execution can be configured to execute a set of programmatic actions when a user utterance of the user-defined command is detected. The ambiguity detection engine can be configured to detect the potential ambiguity between the user provided command and an existing set of speech commands. The speech processing engine can be confused to automatically present the user with at least one synonym to associate with the new user-defined command when the ambiguity detection engine detects the utterance as ambiguous.

It should be noted that various aspects of the invention can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, or any other recording medium. The program can also be provided as a digitally encoded signal conveyed via a carrier wave. The described program can be a simple program or can be implemented as multiple subprograms, each of which interact within a single computing device or interact in a distributed fashion across a network space.

It should also be noted that the methods detailed herein can also be methods performed at least in part by a service agent and/or a machine manipulated by a service agent in response to a service request.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
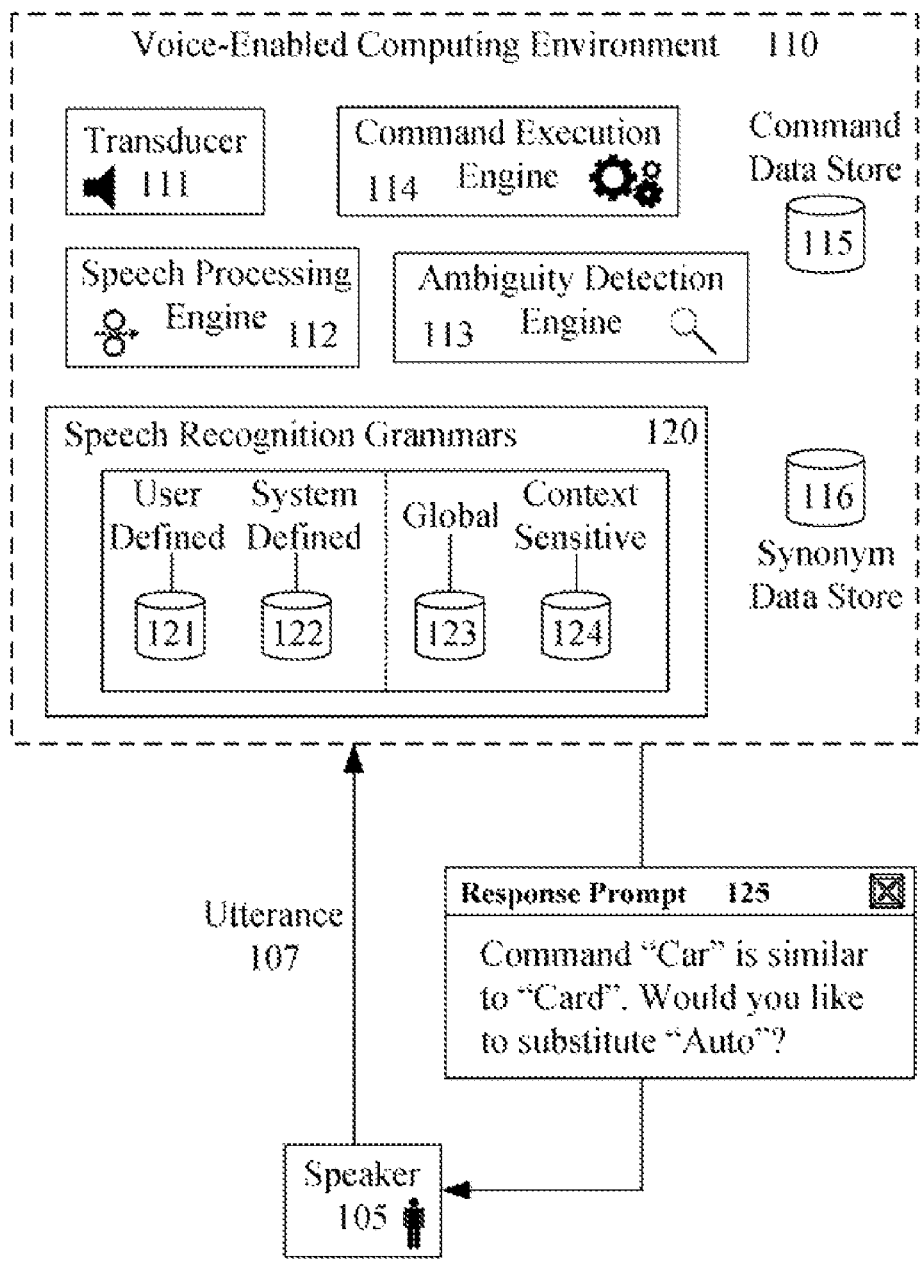
FIG. 1 is a schematic diagram of a system that automatically provides a user with substitutes for potentially ambiguous user-defined speech command in accordance with an embodiment of the inventive arrangements disclosed herein.

FIG. 1 is a schematic diagram of a system 100 that automatically provides a user with substitutes for potentially ambiguous user-defined speech commands in accordance with an embodiment of the inventive arrangements disclosed herein. In system 100, a speaker 105 can provide a spoken utterance 107 meant to be associated as a user-defined command to a voice-enabled computing environment 110. The voice-enabled computing environment 110 can include one or more speech recognition grammars 120, a speech processing engine 112, an ambiguity detection engine 113, a command execution engine 114, a command data store 115, and a synonym data store 116. The speech recognition grammars 120 can include a user-defined grammar 121, a system defined grammar 122, a global grammar 123, and a context sensitive grammar 124.

The computing environment 110 can accept the utterance 107 using a transducer 111, such as a microphone. Upon accepting the utterance 107, the ambiguity detection engine 113 can determine if the utterance 107 is potentially ambiguous and/or acoustically similar to any existing commands contained within the command store 115, which can include user defined 121 commands and/or system defined 122 commands. Commands in store 115 can each be associated with a set of programmatic actions to be performed whenever a user issues the corresponding command. The ambiguity detection engine 113 can determine whether the utterance 107 is potentially ambiguous or acoustically similar to an entry in the command data store 115.

It should be appreciated that in one embodiment, the new user command and/or a potentially ambiguous term can be context dependent terms continued in a context sensitive 124 grammar, as opposed to being terms included in the global 123 grammar, which has a global scope. When one or more confusing terms are context dependent, a likelihood that each confusing term will be simultaneously active can be considered by the ambiguity detection engine 113. For example, if both a new user defined command and a pre-existing acoustically similar command were dependent upon different contexts, which are rarely if ever simultaneously active, then engine 113 can determine the two commands are not likely to be confused with each other.

When engine 113 determines the new command is potentially ambiguous with an existing command, the ambiguity detection engine 113 can search the synonym data store 116 for a synonymous term. The synonymous term found in the synonym data store 116 can be presented to the speaker 105 in a response prompt 125 as a substitute for the term in the utterance 107 by the speech processing engine 112. The response prompt 125 can be provided visually in a Graphical User Interface (GUI) and/or audibly with a voice prompt. As shown in this example, the response prompt 125 notifies the speaker 105 that the user-defined command "Car" is acoustically similar to the existing command of "Card". Additionally, the response prompt 125 includes the substitute term "Auto", which the speaker 105 can accept or decline.

When the speaker 105 provides the computing environment 110 with an answer to the response prompt 125 indicating acceptance of the substitute term, then the substitute can be added to a user-defined grammar 121. Likewise, then the speaker 105 declines the use of the substitute, the utterance 107 can be added to the user-defined grammar 121. A set of actions can be associated with the command saved in the user-defined grammar 121. The command execution engine 114 can execute the associated actions upon receipt of the user-defined command.

Figure 2:
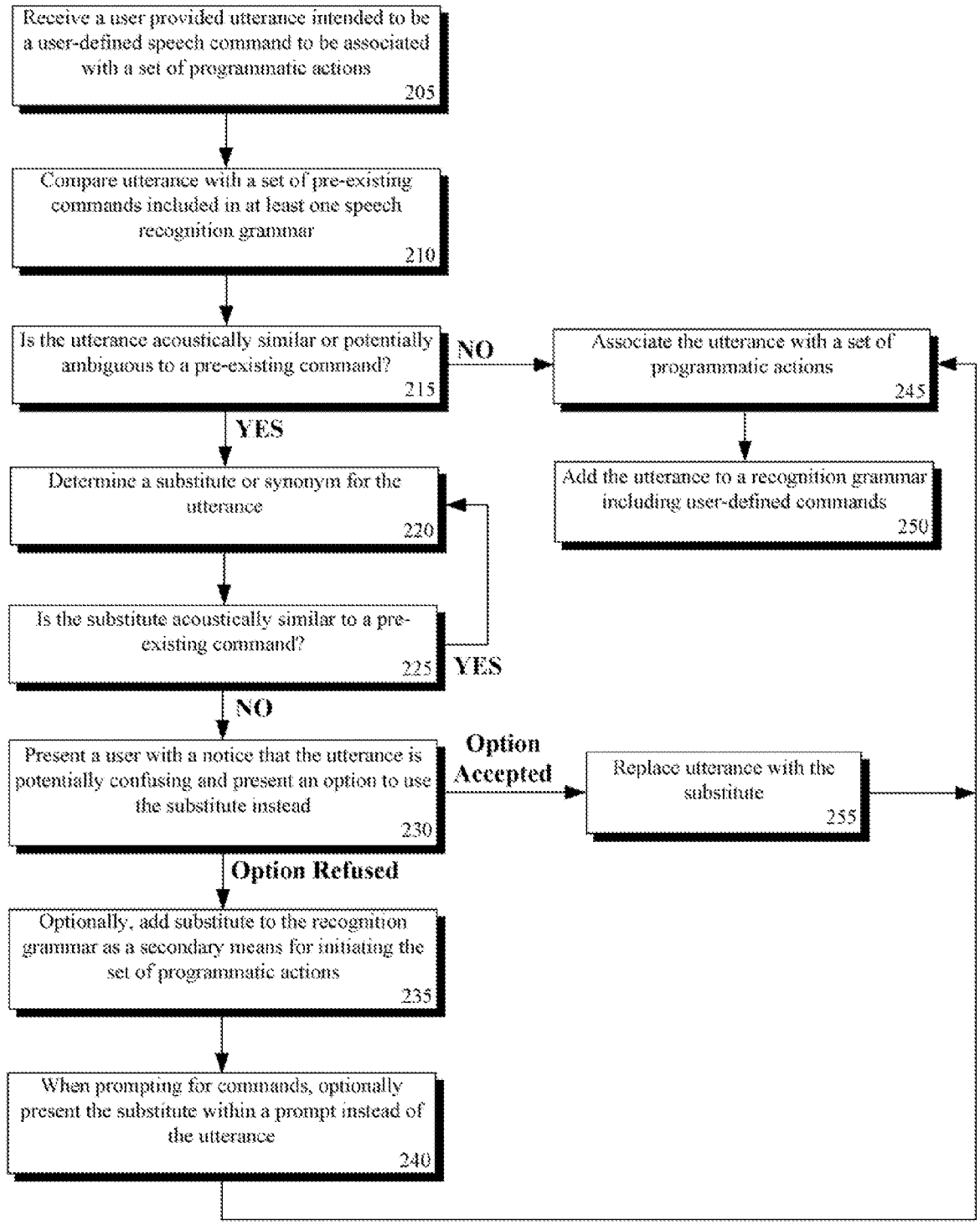
FIG. 2 is a flow chart of a method for automatically providing a user with substitutes for potentially ambiguous user-defined speech commands in accordance with an embodiment of the invention arrangements disclosed herein.

FIG. 2 is a flow chart of a method 200 for automatically providing a user with substitutes for potentially ambiguous user-defined speech commands in accordance with an embodiment of the inventive arrangements disclosed herein. Method 200 can be performed in the context of a system 100.

Method 200 can begin in step 205, where a voice-enabled computing system can receive an utterance provided by a user meant as a command to be associated with a set of programmatic actions. In step 210, the system can compare the utterance with a set of pre-existing commands in at least one speech recognition grammar. It should be noted that the system can contain multiple speech recognition grammars active in different contexts.

In step 215, the system can determine if the provided utterance is potentially ambiguous or acoustically similar to a pre-existing command. When the utterance is found to be potentially ambiguous or acoustically similar to a pre-existing command, the system can determine a substitute or synonym for the utterance in step 220. The method can skip to step 245 if the utterance if not found to be similar or potentially ambiguous. In step 225, the substitute is acoustically similar to a pre-existing command, steps 220 and 225 can be repeated until a dissimilar substitute can be found.

In step 230, a substitute that is dissimilar to pre-existing commands can be presented with a notice that the utterance is potentially confusing and the option to use the determined substitute instead of the utterance. Refusal of the option to use the substitute can cause the system to execute step 235, where the substitute can be optionally added to the speech recognition grammar as a secondary means for initiating the set of programmatic actions. In step 240, the substitute can be used in command prompts instead of the utterance. Flow can then proceed to step 245.

Acceptance of the option to use the substitute executes step 255 where the system can replace the utterance with the substitute. After step 255, step 245 can execute where the system can associated the utterance or selected substitute with a set of programmatic actions. In step 250, the utterance or selected substitute can be added to a speech recognition grammar that includes user-defined commands.

Figure 3:
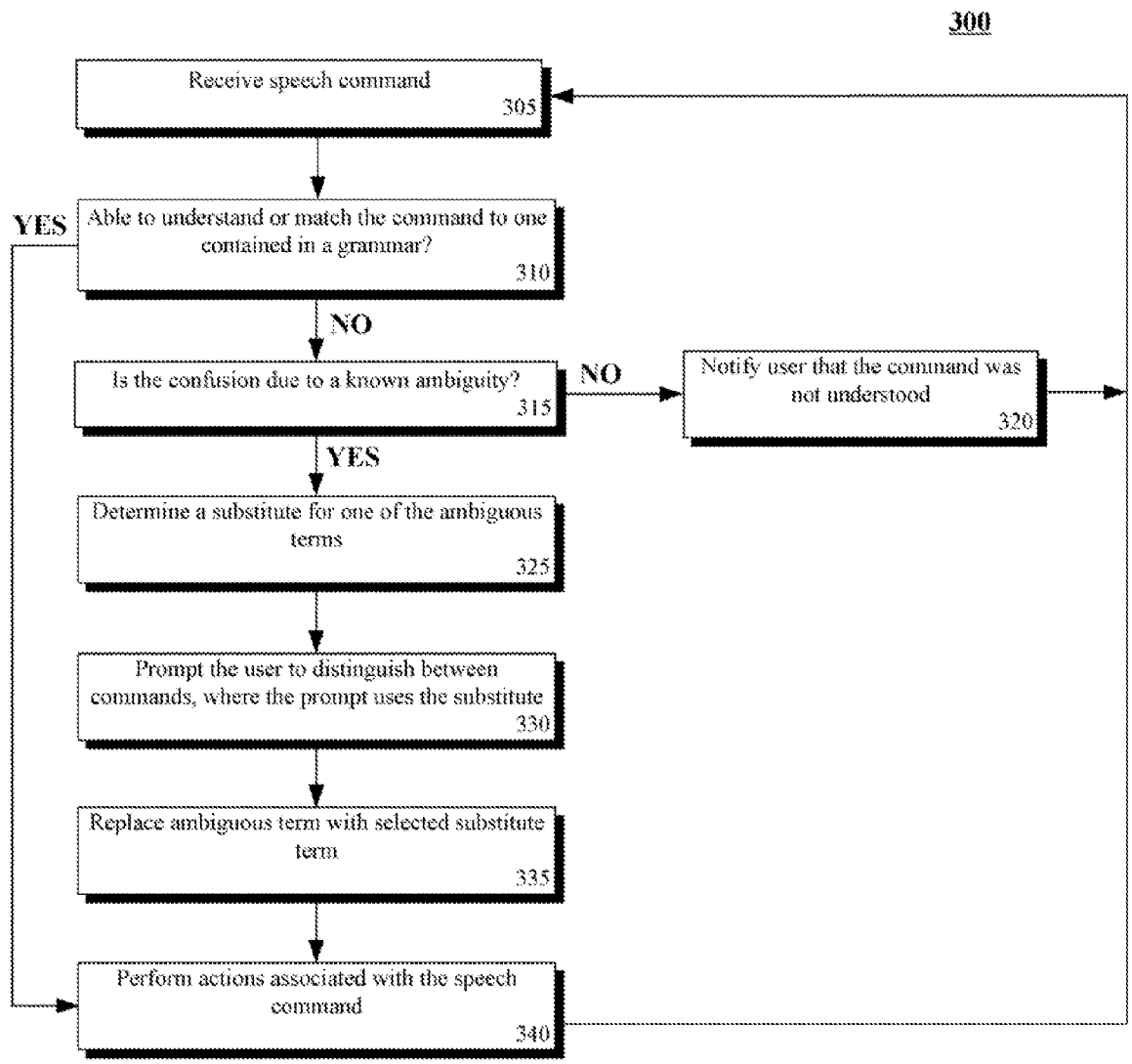
FIG. 3 is a flow chart of a method illustrating the use of a substitute as a secondary mechanism for initiating a user-defined speech command in accordance with an aspect of the inventive arrangements disclosed herein.

FIG. 3 is a flow chart of a method 300 illustrating the use of a substitute as a secondary mechanism for initiating a user-defined speech command in accordance with an aspect of the inventive arrangements disclosed herein. Method 300 can be performed in the context of system 100. Method 300 assumes that a presented substitute was saved as secondary triggering mechanism, as outlined in method 200.

Method 300 can begin in step 305, where a system can receive a speech command. In step 310, the system can attempt to understand or match the received command in one contained in an existing speech recognition grammar. The ability to understand or match the received command can divert the method to step 340. The inability to understand or match the received command can execute step 315, where it can be determined if the confusion is due to a known ambiguity.

If the confusion is not due to a known ambiguity, the system can notify the user that the command was not understood in step 320. When the confusion is due to a known ambiguity, a substitute can be determined for one of the ambiguous terms in step 325. In step 330, the user can be prompted to distinguish between the commands, using the substitute term.

The ambiguous term can be replaced with the substitute term in step 335. In step 340, the actions associated with the speech command can be executed. After the execution of step 320 or 340, the method can reiterate with flow returning to step 305.

Figure 4:
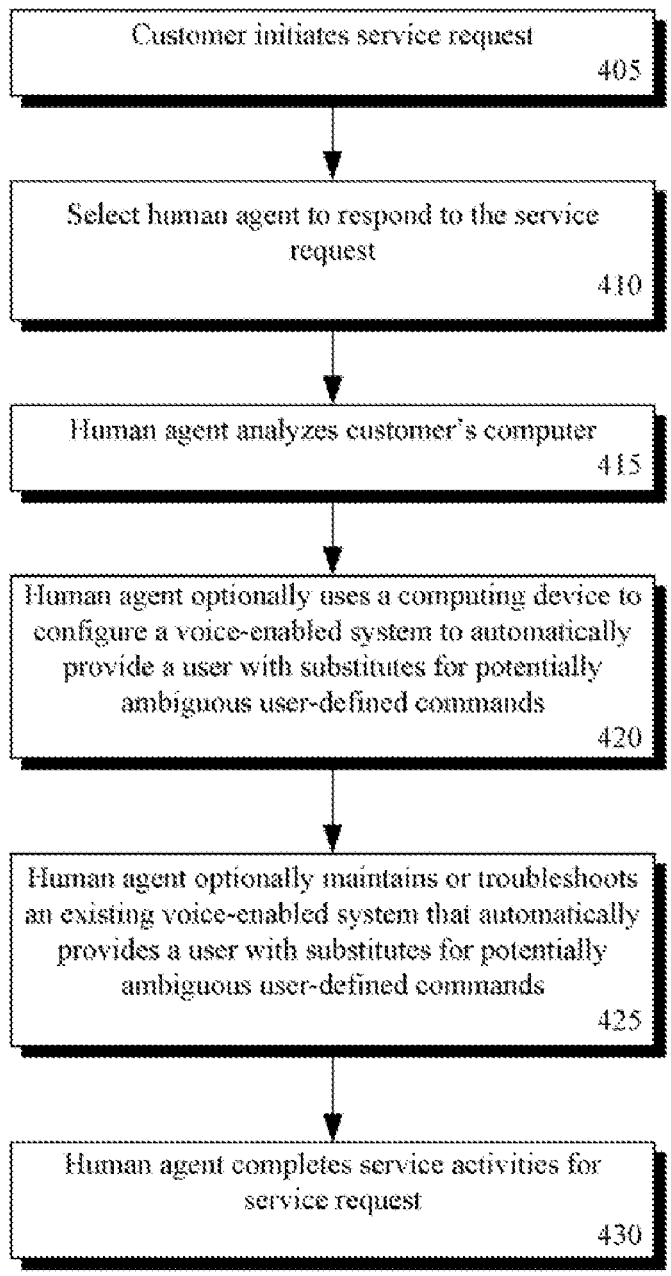
FIG. 4 is a flow chart of a method where a service agent can configure a voice-enabled system to automatically provide a user with substitutes for potentially ambiguous user-defined commands in accordance with an embodiment of the inventive arrangements disclosed herein.

FIG. 4 is a flow chart of a method 400, where a server agent can configure a voice-enabled system to automatically provide a user with substitutes for potentially ambiguous user-defined commands in accordance with an embodiment of the inventive arrangements disclosed herein. Method 400 can be performed in the context of system 100 and/or methods 200 and 300.

Method 400 can begin in step 405, when a customer initiates a service request. The service request can be a request for a service agent to provide a customer with a voice-enabled system that provides substitutes for potentially ambiguous user-defined commands. The service request can also be for an agent to enhance an existing voice-enabled system with the ability to provide substitutes to potentially ambiguous commands. The service request can also be for a technician to troubleshoot a problem with an existing system.

In step 410, a human agent can be selected to respond to the service request. In step 415, the human agent can analyze a customer's current system and/or problem and can responsively develop a solution. In step 420, the human agent can use one or more computing devices to configure a voice-enabled system to automatically provide a user with substitutes for potentially ambiguous commands.

In step 425, the human agent can optionally maintain or troubleshoot a voice-enabled system to automatically provide a user with substitutes for potentially ambiguous commands. In step 430, the human agent can complete the service activities.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer programs in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A method comprising:
operating at least one processor programmed to perform
receiving an original command for a user-defined speech command;
determining whether the original command is likely to be confused with a set of existing speech commands;
when confusion is unlikely, automatically storing the original command as the user-defined speech command; and
when confusion is likely, automatically determining at least one substitute command that is unlikely to be confused with the set, presenting the substitute command as an alternative to the original command, and selectively storing the substitute command as the user-defined speech command.

2. The method of claim 1, wherein the substitute command is an automatically determined synonym for the original command.

3. The method of claim 1, wherein the selectively storing step is based upon a user response to the presenting of the substitute command, wherein when the user response indicates a preference to use the original command, the original command is stored as the user-defined speech command.

4. The method of claim 3, wherein when the user response indicates a preference to use the original command, the substitute command is stored as a secondary command for the user-defined speech command, wherein both the original command and the substitute command are able to be used to initiate a set of actions associated with the user-defined speech command.

5. The method of claim 4, wherein the at least one processor is further programmed to perform:
when presenting a prompt relating to the user-defined speech command, presenting the substitute as a trigger for the user-defined speech command instead of presenting the original command.

6. The method of claim 1, wherein the at least one processor is further programmed to perform:
establishing a configurable confusion threshold, wherein a likelihood of whether the original command is confusing with at least one command in the set is based upon whether the confusion threshold is exceeded.

7. The method of claim 1, wherein the likelihood of whether the original command is confusing with at least one command in the set is based upon a determined acoustic similarity between the original command and the at least one command.

8. The method of claim 1, wherein operating the at least one processor to perform the receiving, determining, automatically storing, automatically determining, presenting, and selectively storing comprises operating the at least one processor in accordance with at least one computer program having a plurality of code sections that are executable by the at least one processor.

9. The method of claim 1, wherein the steps of claim 1 are performed by at least one of a service agent and a computing device, comprising the at least one processor, manipulated by the service agents, the steps being performed in response to a service request.

10. A method comprising:
operating at least one processor programmed to perform
ascertaining that an utterance to be associated with a user-defined speech command is acoustically similar to an existing speech command;
automatically determining at least one substitute for the utterance; and
presenting the substitute as an alternative to the utterance.

11. The method of claim 10, wherein the at least one processor is further programmed to perform:
receiving a user acceptance of the substitute; and
adding the substitute to a speech recognition grammar as the user-defined speech command.

12. The method of claim 10, wherein the user-defined speech command is associated with at least one programmatic action, and
wherein the at least one processor is further programmed to perform:
receiving a speech segment from a user;
determining that the speech segment includes the substitute; and
automatically initiating the at least one programmatic action based on the determining step.

13. The method of claim 10, wherein the determining step further comprises:
automatically determining a synonym for the utterance, wherein the substitute is the synonym.

14. The method of claim 10, wherein the at least one substitute comprises a plurality of substitutes, which are each presented in the presenting step.

15. The method of claim 10, wherein the at least one substitute comprises a first substitute and a second substitute, said determining step further comprises:
automatically determining the first substitute;
ascertaining that the first substitute is acoustically similar to an existing speech command;
automatically determining the second substitute; and
ascertaining that the second substitute is not acoustically similar to an existing speech command, wherein the second substitute is the substitute presented in the presenting step.

16. The method of claim 10, wherein the at least one processor is further programmed to perform:
establishing a configurable similarity threshold, wherein the ascertaining step is based upon the similarity threshold.

17. The method of claim 10, wherein the at least one processor is further programmed to perform:
receiving a user denial of the substitute and a user selection of the utterance; and
adding the utterance to a speech recognition grammar as the user-defined speech command.

18. The method of claim 17, wherein the at least one processor is further programmed to perform:
adding the substitute to a speech recognition grammar as an alternative mechanism for initializing the user-defined speech command.

19. The method of claim 18, when presenting a prompt relating to the user-defined speech command, presenting the substitute as a mechanism for initiating the user-defined speech command instead of presenting the original command.

20. A speech processing system comprising:
at least one processor;
at least one speech recognition grammar including at least one user-defined command;
a command execution engine configured to initiate a set of programmatic actions upon detection of user utterance of the user-defined command;
an ambiguity detection engine configured to detect a potential ambiguity between a user provided command and a set of previously established speech commands;
a synonym data store comprising at least one synonym for the user provided command; and
a speech processing engine configured to automatically present a user with the at least one synonym to associate with a new user-defined command, wherever a user provided command for the new user-defined command is determined to be ambiguous by the ambiguity detection engine.

* * * * *